United States Patent Office 3,206,333
Patented Sept. 14, 1965

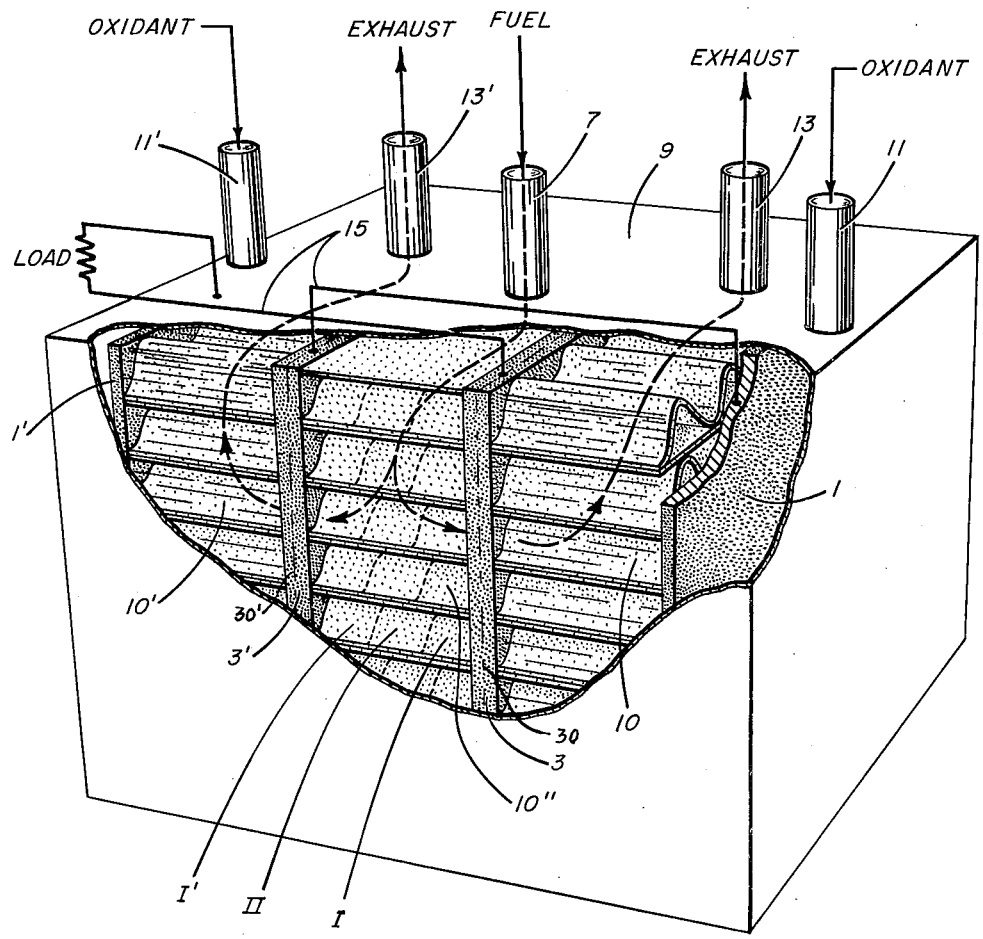

3,206,333
ELECTROCHEMICAL STRUCTURE
John Roos Ehrenfeld, South Acton, Mass., assignor to Prototech Incorporated, Cambridge, Mass., a corporation of Massachusetts
Filed Mar. 20, 1962, Ser. No. 180,967
13 Claims. (Cl. 136—86)

The present invention relates to electrochemical structures and assemblies and, more particularly, to fuel cells and the like that are adapted to perform multiple functions.

There are disclosed in co-pending applications, Serial No. 154,724, filed November 24, 1961, by Walter Juda, for "Electrolytic Cell Structure," and Serial No. 156,671, filed December 4, 1961, by John Roos Ehrenfeld, for "Electrochemical Cell Sstructure," novel electrolyte- and electrode-supporting structures that enable the practical fabrication and utilization of thin electronically-conductive layers that otherwise may not be self-supporting and that, in some cases, are difficult to manufacture with pores therein, as may be required in certain electrode applications, such as those related to a variety of electrochemical cells, including fuel cells and the like. In accordance with the inventions disclosed in the said applications, electronically-conductive layers are adhered, as by direct sintering, to electronic insulator materials, preferably porous, and assuming the form of an array or plurality of continuous, juxtaposed, substantially straight-through or parallel cells. Sinter techniques for forming and adhering porous conductive layers to a support which may be used in the above structures are described, for example, in chapters 14 and 15, volume I, of Treatise on Powder Metallurgy, C. Goetzel, Interscience Publishers, 1949. The phrase, "electronic insulator," moreover, as employed herein, is intended to connote materials that do not support electronic conduction, such as the usual insulators of glass, ceramics, and the like, as well as ionic-conducting solid materials, discussed, for example, in Ion Exchange Resins, Robert Kunin, 2nd ed., 1958, John Wiley & Sons, Inc., New York, chapters 5 and 11.

As explained in the said applications, it has been discovered that sintering thin metal or other similar electronically-conductive layers to such electronic-insulator materials has been found to result in a sturdy electrode configuration that is eminently suitable for supporting otherwise unsupportable electronically-conductive layers and that, in particular, is suitable for fabrication in the form of porous electrodes, as a result of the direct sintering process, extending over both small and large-size areas.

Preferred materials of the character above-described include pyroceramic or high-temperature ceramic materials, such as those manufactured under the trademark "Cercor" by the Corning Glass Works, having at least 50% and preferably much greater open-face area, with honeycomb-like cells of preferably porous-wall construction, having a wall thickness of the order of a few mils, a wall porosity of the order of 40%, more or less, and a cell cross-dimension of the order of 50 mils, more or less.

Improved electrochemical cell structures that embody the principles of construction above discussed, but with further advantageous results, including the utilization of the supporting structure itself as an inlet for fuel or oxidant in, for example, a fuel cell or similar apparatus, are also described in the said Ehrenfeld application. Such structures further permit the utilization of catalytic layers within the electrode structure or its environs.

An object of the present invention is to provide a new and improved composite cell structure or assembly that preferably employs structures of the character described in the said applications, but that is particularly adapted for multiple-function operation in a composite structure.

A further object is to provide a multiple-function or plural fuel cell assembly of more general utility, also.

Other and further objects will be explained hereinafter and will be more particularly pointed out in connection with the appended claims. In summary, however, from one of its broadest aspects, the invention is a composite electrochemical structure comprising a macroporous support bounded by a pair of porous electrodes, a pair of insulating electrolyte-supporting means connected with the surfaces of the said electrodes opposite those bounding the macroporous support, and further electrode means bounding the electrolyte-supporting means. Details of preferred structures are hereinafter set forth.

The invention will now be described in connection with the accompanying drawing, the single figure of which is an isometric view, partly cut away to illustrate details of construction, showing the invention in preferred form.

Referring to the drawing, porous electronically-conductive electrode layers 1 and 1' are shown, greatly magnified in thickness, preferably sintered or otherwise directly secured to the respective right-hand and left-hand faces of a pair of arrays or pluralities of preferably continuous juxtaposed substantially straight-through parallel electrolyte-supporting cells 10 and 10' of electronic-insulator material, such as the macroporous cellular pyroceramic material before-mentioned. The sintered electrodes 1 and 1', as of silver or platinized silver or the like, thus externally bound the cells 10 and 10' at their ends, the cells containing aqueous or other electrolyte, such as molten $NaLiCO_3$ or other suitable well-known electrolyte. At the respective left-hand and right-hand faces of the cells 10 and 10', further directly sintered porous electrodes 3 and 3' are provided, as of stainless steel or the like, to provide a pair of fuel cells 1–10–3 and 1'–10'–3', later more fully described.

The opposite surfaces of the porous electrodes 3 and 3' are sintered or otherwise secured to a porous catalytic structure 10" which may be similar to the porous-insulating cell structure 10, as of the above-mentioned type, or which may comprise or consist of an electronically-conducting porous cellular medium (typically a metal). In fact, the porous structure 10" may even consist of a porous catalytic metal, later discussed, with the porous electrodes 3 and 3' bounding the same.

As is particularly described in the said Ehrenfeld application, a hydrocarbon, such as methane or the like or other suitable fuel, such as methanol or the like, may be introduced at an inlet 7 in an outer housing 9 containing the composite structure 1–10–3–10"–3'–10'–1', directly into the pores of the cellular support 10" to provide reforming operation within the structure 10". The porous cellular support 10" may be divided into three vertical sections I–II–I', containing coatings or deposits of multiple catalytic material for achieving reforming. At a temperature of the order of 500° C. or greater, for example, nickel particles disposed at the porous section II will react upon the hydrocarbon fuel and steam, entering at 7 above the central section II, to effect a catalytic reforming of the fuel into carbon monoxide and hydrogen. The further catalytic action of, for example, iron oxide particles disposed at the sections I and I', will then effect a conversion or shift to carbon dioxide and hydrogen, with hydrogen ions resulting after passage out of the reforming region 10", through each of the porous electrodes 3 and 3', into the pair of fuel cells 3–10–1 and 3'–10'–1'.

The three sections I, II and I' of the porous cellular support of the reforming chamber of compartment 10" may be separately prepared and joined, as by depositing nickel salts on the section II and reducing the same to provide nickel particles that still maintain porosity of the cell walls, and by depositing iron particles and oxidizing the same at the walls of sections I and I', again still maintaining porosity.

The application of oxidant at respective inlets 11 and 11' and through the porous electrodes 1 and 1' into the electrolyte-supporting cells 10 and 10' will enable multiple or plural fuel-cell operation in the regions 1–10–3 and 1'–10'–3' with the hydrogen entering the electrodes 3 and 3' from the reforming section 10" serving as the reformed fuel, and with reaction products exhausted or removed from, for example, outlets 13 and 13', shown communicating with top edges of the cells 10 and 10', which may be left unsealed. The two fuel cells 1–10–3 and 1'–10–3' may thus be electrically connected in series by conductors 15 to an external load and will provide multiple fuel cells in a combined sandwich-like unitary structure with the reforming catalytic cell. The heat generated by the fuel cells and contained within the housing 9, moreover, will be beneficially employed in the reforming cell.

It is to be understood that the porous catalytic medium 10" can comprise metallic and/or non-metallic structures and that a porous metallic medium can differ from the metal of the porous electrodes 3 and 3', as in the illustrations before given. Further, the porosity of the catalytic structure 10" can differ from the porosity of the electrodes 3 and 3'. The porosity of the "reforming" cellular section 10" may also be different from that of the cellular electrolyte supports 10 and 10'. The choice of the metal and/or non-metal and the control of porosity of the reforming medium 10" and the electrodes 3 and 3' permits regulation of the reaction rates of the catalytic conversion and the electrode reaction at a predetermined set of temperature and pressure conditions. In the event that the porous structure or support 10" is of metal, the series electrical connection 15 will be changed to a parallel connection.

At least two layers of sintered metal electrodes at 1, 1', 3 and 3', moreover, are advantageous in fuel cells because greater uniformity is achieved. This is shown at 30 and 30' in connection with the electrodes 3 and 3'. Further, two or more such layers of different pore size, sintered together, permit better fuel utilization per pass through the electrodes. A special construction of the invention involves multiple electrode layers 1, 1', 3, 3' and preferably such double layers 30 or 30' of different porosity.

It is to be understood that the multiple composite structure of the present invention may also employ other types of porous electrolyte-supporting media, although the above-mentioned and illustrated type is preferred because of its low cell resistance and inherent electrode-supporting structure characteristics. Similarly, the composite structure may be extended to add further fuel and reformer cells thereto.

The structures of the invention, furthermore, are especially adapted for efficient heat exchange between the electrolyte sections 10 and 10' where heat is generated as an inefficiency, and the catalytic section 10" where heat may be required, for example, for the reforming reaction. This feature is especially advantageous when the structure is operated as a high-temperature fuel cell with a built-in reforming section for hydrocarbon-steam mixtures at temperatures above 500° C., and preferably between 700–900° C., or with methanol or steam-methanol mixtures at temperatures above 400° C.

Further modifications will also occur to those skilled in the art and all such are considered to fall within the spirit and scope of the invention as defined in the appended claims.

What is claimed is:

1. In an electrolytic cell device, a structure comprising a two-dimensional array of continuous, juxtaposed, substantially parallel, tubular, open-ended cells having porous walls extending along the length of said cells between opposite sides of said structure, a pair of gas-pervious electrodes at the respective sides of said structure covering the adjacent open ends of said cells, the cell walls extending transversely from said electrodes and having a length normal to said electrodes which is substantially greater than the thickness of said walls, the width of said cells parallel to said electrodes being substantially greater than the cell wall thickness to provide a large open area for communication of the interior of said cells with said electrodes, a further pair of electrodes spaced respectively from the electrodes of the first-mentioned pair in the direction of the length of said cells, an electrolyte disposed between and in contact with each electrode of the first-mentioned pair and the associated electrode of the further pair, a housing having a wall enclosing the space between the electrodes of the first-mentioned pair occupied by said structure, means for introducing a fluid into said housing through said housing wall, whereby the fluid may enter said cells through the pores in the cell walls, and means for connecting an electric circuit to said electrodes.

2. The device of claim 1, in which a porous cellular structure similar to the first-mentioned structure is disposed between each electrode of the first-mentioned pair and the associated electrode of the further pair.

3. The device of claim 1, said housing surrounding said electrodes and said structure and having a pair of chambers adjacent to the electrodes of the further pair, and means for introducing another fluid into said pair of chambers, one of said fluids being a fuel and the other being an oxidant.

4. The device of claim 3, in which said further electrodes are gas-pervious.

5. The device of claim 3, further comprising means providing exhaust openings in said housing communicating with the spaces between the associated electrodes of said pairs.

6. The device of claim 1, in which at least one of said electrodes comprises at least two layers of metal connected to each other.

7. The device of claim 6, in which said layers are porous and have different porosity.

8. The device of claim 1, in which said cell walls are metal.

9. The device of claim 1, in which said cell walls are electronic-insulator material.

10. The device of claim 1, in which said fluid comprises a mixture of hydrocarbon fuel and steam, said structure supporting a catalyst for effecting reforming of at least part of said fuel into hydrogen.

11. In an electrolytic cell device, a structure comprising a two-dimensional array of continuous, juxtaposed, substantially parallel, tubular, open-ended cells having porous walls extending along the length of said cells between opposite sides of said structure, a gas-pervious electrode at one side of said structure covering the adjacent open ends of said cells, the cell walls extending transversely from said electrode and having a length normal to said electrode which is substantially greater than the thickness of said walls, the width of said cells parallel to said electrode being substantially greater than the cell wall thickness to provide a large open area for communication of the interior of said cells with said electrode, means covering the open ends of said cells at the other side of said structure, a further electrode spaced from the first-mentioned electrode at the side thereof remote from said structure, an electrolyte disposed in the space between and in contact with said electrodes, a housing having a wall enclosing the space between the first-mentioned electrode and said covering means occupied by said structure, means for introducing a fluid into said housing through said housing wall, whereby said fluid may enter said cells through the pores in the cell walls, and means for connecting an electric circuit to said electrodes.

12. In a high temperature fuel cell device, the combination of a catalyst support comprising a multiplicity of passages terminating in openings at one side of said support, a first electrode layer covering said openings, said openings being disposed over substantially the entire area of said electrode layer, said passages having walls bounded by catalytic material for reformation of a fuel containing combined hydrogen and carbon, said electrode layer being hydrogen-pervious and being very thin compared to the length of said passages, a second electrode layer spaced from the first electrode layer at the side thereof opposite to said catalyst support, an electrolyte between said electrode layers forming therewith an electrolytic cell, and means for introducing a said fuel into said passages, said catalytic material being arranged to receive heat through said first electrode layer from the electrolytic reaction in said cell to assist in the reformation of said fuel by said catalytic material under the influence of heat and thereby to produce hydrogen at said openings over substantially the entire area of said first electrode layer.

13. The device of claim 12, said catalyst support having a second side oppositely disposed to said one side and having a multiplicity of passage openings at said second side, a third electrode layer covering the last-mentioned openings being disposed over substantially the entire area of said third electrode layer, said third electrode layer being hydrogen-pervious and being very thin compared to the length of said passages, a fourth electrode layer spaced from the third electrode layer at the side thereof opposite to said catalyst support, an electrolyte between said third and fourth electrode layers forming therewith a further electrolytic cell, said catalytic material being arranged to receive heat through said third electrode layer from the electrolytic reaction in said further cell to assist in the reformation of said fuel by said catalytic material under the influence of heat and thereby to produce hydrogen at the last-mentioned openings over substantially the entire area of said third electrode layer.

References Cited by the Examiner

UNITED STATES PATENTS

| | | | |
|---|---|---|---|
| 406,267 | 7/89 | Currie | 136—143 |
| 409,366 | 8/89 | Mond et al. | 136—86 |
| 411,426 | 9/89 | Dahl | 136—86 |
| 1,124,347 | 1/15 | Snelling | 23—212 |
| 1,174,631 | 3/16 | Snelling | 23—210 X |
| 1,299,641 | 4/19 | Weintraub | 252—477 |
| 1,329,180 | 1/20 | Holland | 136—143 |
| 1,951,280 | 3/34 | Hale | 23—288 |
| 2,384,463 | 9/45 | Gunn et al. | 136—86 |
| 2,709,128 | 5/55 | Krause | 23—288 |
| 2,804,482 | 8/57 | Hunter et al. | 252—477 |
| 2,880,260 | 3/59 | Strauss | 136—143 |
| 2,887,456 | 5/59 | Halford et al. | 252—477 |
| 2,925,455 | 2/60 | Eidensohn et al. | 136—86 |
| 2,980,749 | 4/61 | Broers | 136—86 |

JOHN H. MACK, *Primary Examiner.*

JOHN R. SPECK, *Examiner.*